Oct. 4, 1960 L. F. NELSON 2,954,886
BALE LOADER ATTACHMENT FOR VEHICLES
Filed Sept. 4, 1957 4 Sheets-Sheet 2

INVENTOR
LELAND F. NELSON

BY
ATTORNEYS

Oct. 4, 1960  L. F. NELSON  2,954,886
BALE LOADER ATTACHMENT FOR VEHICLES
Filed Sept. 4, 1957  4 Sheets-Sheet 3
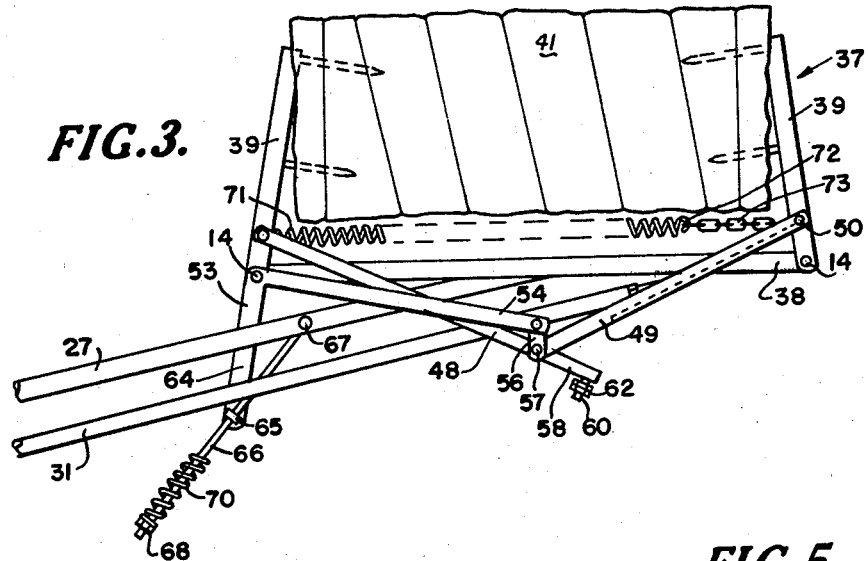
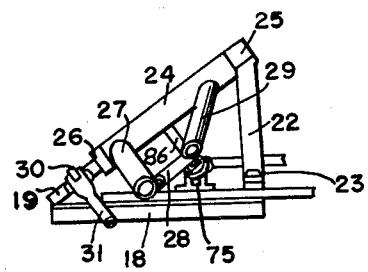
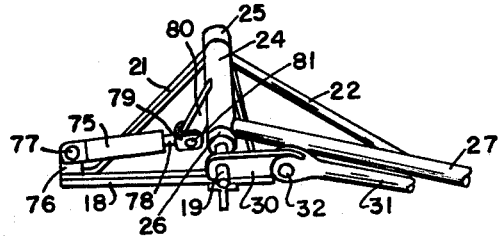
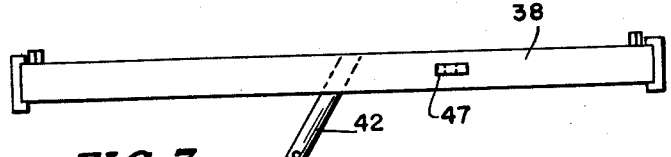
INVENTOR
LELAND F. NELSON
BY
ATTORNEYS Oct. 4, 1960   L. F. NELSON   2,954,886
BALE LOADER ATTACHMENT FOR VEHICLES
Filed Sept. 4, 1957   4 Sheets-Sheet 4

INVENTOR
LELAND F. NELSON

BY
ATTORNEYS

United States Patent Office 2,954,886
Patented Oct. 4, 1960

2,954,886
BALE LOADER ATTACHMENT FOR VEHICLES
Leland F. Nelson, Broken Bow, Nebr.
Filed Sept. 4, 1957, Ser. No. 681,969
9 Claims. (Cl. 214—80)

The present invention relates to a bale-loading attachment for farm vehicles and, more particularly, to improved means for lifting bales disposed on one side of a tractor and transferring them to a loading truck or the like.

It is customary in collecting bales of hay to arrange the hay in spaced rows of windrows so that the bales may be picked up and carried to a loading vehicle or receptacle. Accordingly, an important object is to associate with a farm vehicle, such as a tractor or the like, a bale-loading attachment having simple, efficient, light, and compact means for gripping sequentially each bale lying on the ground as the vehicle is moved along one side of the spaced bale windrows. Additionally, means are provided as the loader attachment is being raised to its discharge position, for turning or rotating the bale so as to position the same in the rear of the tractor and above the wagon, trailer, or the like, on which the bales are to be deposited or loaded.

A further object consists in associating with a lifting arm and turning arm of a loading attachment, a bale-engaging assembly positioned on one side of a farm vehicle or tractor, and arranged to grip a bale on the ground during the advancing movement of the tractor. The loader and bale assembly are provided with co-acting means operable as the bale is being moved to its discharge position above the tractor, for bodily turning the bale-engaging assembly relative to the lifting arm. Releasable means carried by the loader are operatively connected to the grippers or jaws of the bale assembly for releasing the bale when the loader is raised to a predetermined position.

Another object consists in forming the bale-engaging assembly with a transverse member or bar to which are pivotally connected the spaced bale-engaging jaws or forks. Between the forks and pivotally connected thereto are a pair of transversely disposed coacting overcenter members, which are operatively connected to a bell crank releasing member having an actuating arm positioned to be engaged by a bale on the ground, so as to cause the overcenter arms to break at the center and be moved rearwardly. Due to the operative connection of the spaced forks or jaws with the overcenter arms, the rearward movement of the latter causes the forks or arms to be moved inwardly into engagement with the sides of a bale or the like, so that the same may be raised and transferred to a suitable point of discharge by the loader.

A still further object comprehends the provision of means for rotatably connecting the bale-engaging assembly to the lifting arm or member of the bale-loader attachment. Additionally, means are provided for turning the bale-loader attachment substantially 90° as the loader and the bale engaged therewith are raised from the ground and transferred to a point above and to the rear of the tractor.

Another object consists in providing the rear of a farm vehicle, such as a tractor, with a support having a longitudinally disposed inclined shaft extending upwardly towards the front of the tractor at substantially an angle of 40°. A bale loader is rotatably mounted on the shaft and extends outwardly and laterally from one side of the tractor. The loader carries a vertically movable lifting member which is pivotally or rotatably connected to a bale-engaging assembly that constitutes a part of the loader and is disposed to one side of the tractor, so as to pick up individually, the spaced bales on the ground during the advancing movement of the tractor. A turning member is pivotally connected to the support shaft on the loader and is centrally offset relative to the pivotal center of the lifting member. The turning member is also pivotally connected to the bale-engaging assembly and, when the loader is in its lower bale-engaging position adjacent the ground, it is disposed on one side of the lifting member. Transversely spaced forks or grippers are pivotally connected to the bale assembly, and means are provided operable, when the assembly engages the bale, for moving the forks into gripping engagement with the sides of the bale.

Other objects and advantages of the invention will become apparent from the following description, when taken in conjunction with the accompanying claims and drawings.

Referring to the drawings in which, for the purpose of illustration, is shown a preferred embodiment of the invention:

Figure 2 is a perspective view showing the loader attachment in its raised position above and to the rear of the tractor prior to dishcarging the bale onto a truck or the like;

Figure 3 is a detailed plan view of the loader attachment, showing the bale assembly moved into gripping engagement with a bale on the ground;

Figure 4 is a perspective detailed view of the supporting means carried by the tractor and to which the loader attachment is movably connected;

Figure 5 is a side elevational view of Figure 4;

Figure 6 is a sectional view taken substantially along the line 6—6 of Figure 1 and looking in the direction of the arrows;

Figure 7 is a detailed plan view of the transverse member or bar constituting a part of the bale assembly and to which the spaced forks or jaws are pivotally connected;

Figure 1:
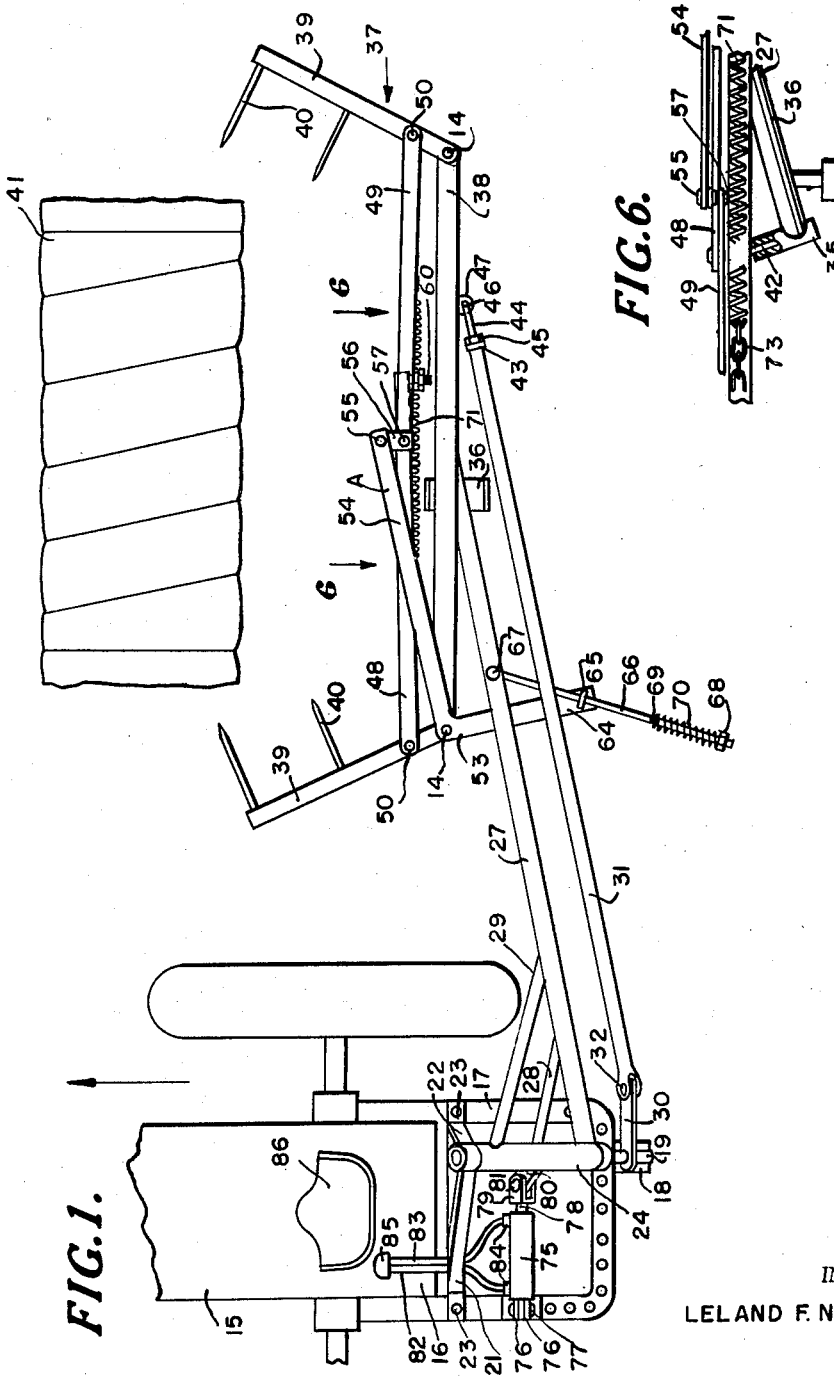
Figure 1 is a detailed plan view of the loader attachment connected to a farm vehicle, such as a tractor or the like, and showing the bale-engaging assembly in its lower position and prior to engaging a bale on the ground.
Figure 2:
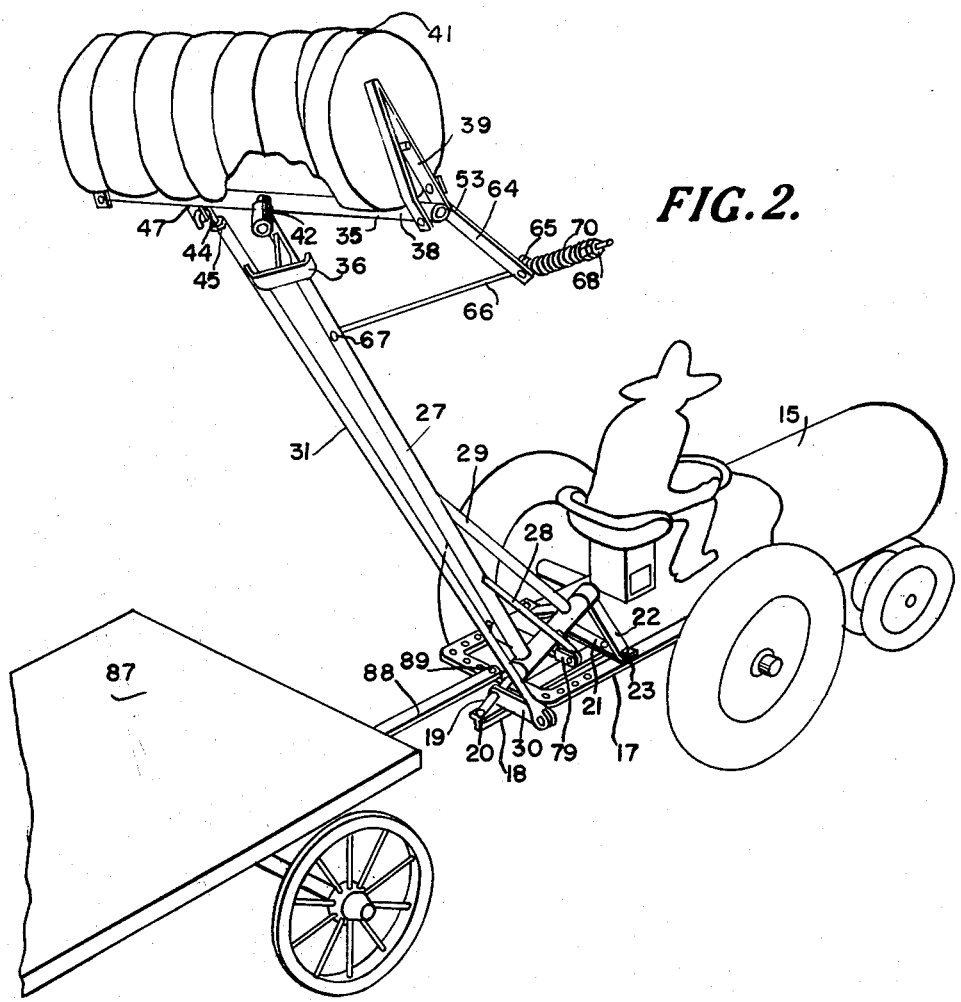
Figure 8:
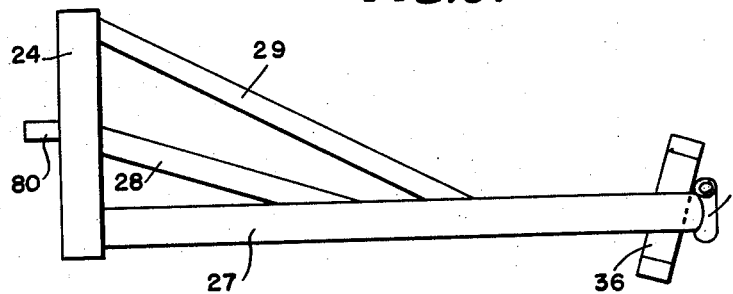
Figure 8 is a detailed plan view of the lifting member and its associated parts.
Figure 9:
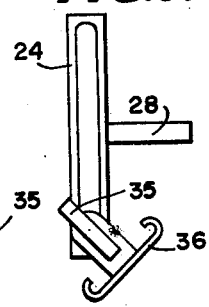
Figure 9 is a righthand end view of Figure 8.
Figure 10:
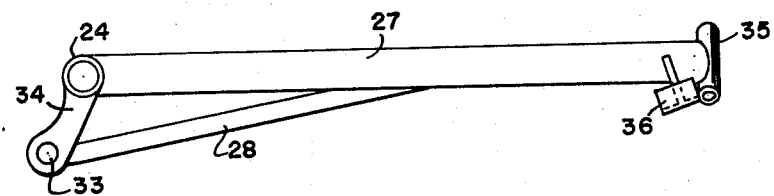
Figure 10 is a side elevational view of Figure 8.

Referring to the drawings, 15 indicates a farm vehicle, such as a tractor or the like. To the rear 16 (Fig. 1) of the farm tractor may be connected a substantially U-shaped hitch frame 17 that has extending longitudinally therefrom a T-shaped bar 18 (Fig. 2). An inclined fixed shaft 19 extends upwardly and forwardly of the hitch frame 17 at an angle of substantially 40° and may be welded at its lower end at 20 (Fig. 2) to the bar 18, and is supported at its opposite upper end by a transversely disposed mounting 21, that includes the upwardly inclined brace bars 22 that may be secured to the side arms of the hitch frame 17 in any suitable manner, such as by the bolts or rivets 23. Rotatably mounted on the inclined shaft 19 is a sleeve or tubular member 24. The brace bars 21 and 22 are welded or otherwise secured to a bearing collar 25 through which the shaft 19 extends and which constitutes an abutment for the upper end of the sleeve 24. The lower end of the sleeve 24 has fixed thereon a collar 26 that coacts with the collar 25 for providing means for limiting the axial movement of the sleeve 24 relative to the shaft 19 while allowing free rotatable movement of the sleeve relative to the shaft. Extending outwardly and laterally from the tubular member or sleeve 24 is a lifting arm or member 27 and inclined brace bars 28 and 29 that are also connected to the arm 27 for supporting the same (Fig. 8). Fixed to the lower end portion of the shaft 19 and extending laterally therefrom is a link 30 (Fig. 4) to which is pivotally connected the inner end of a turning member or arm 31 as at 32. The brace rod 28 may be connected at its inner end as at 33 to a depending lug 34 fixed to the sleeve or tubular member 24 (Fig. 10). The outer end of the lifting arm 27 has a transversely disposed sleeve 35 secured thereto in any suitable manner, such as by welding or the like (Fig. 8), and also carries a ground-engaging runner or shoe 36. The bale loader attachment includes the sleeve 24, lifting arm 27, and the turning arm 31, as well as their associated parts, and the bale-engaging assembly generally indicated by the numeral 37 (Fig. 1). This bale-engaging assembly includes a transverse bar or member 38 to the opposite ends of which are pivotally connected the bale-engaging forks or gripping jaws 39 as at 14. The forks 39 have prongs or teeth 40 extending inwardly so as releasably to engage the side of a round bale or the like 41, as the latter is positioned on the ground in rows of spaced windrows.

Figure 12:
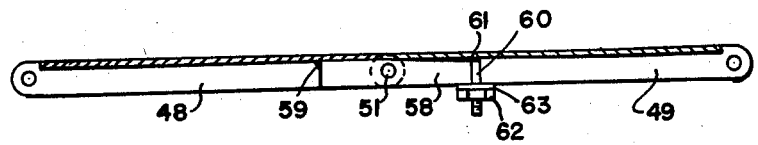
Figure 12 is a sectional view taken substantially along the line 12—12 of Figure 11.
Figure 11:
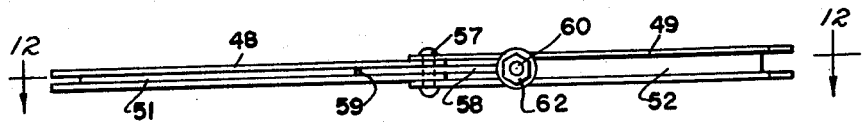
Figure 11 is a detailed side view of the overcenter members or arms.

The transverse member 38 of the bale-engaging assembly (Fig. 7) has an inclined shaft or pin 42 extending rearwardly therefrom at an angle of substantially 75°. This angle, as well as the angle of the shaft 19 and the sleeve 24, may vary as operating conditions require. The shaft 42 may be welded or otherwise secured to the underside of the bar 38 and is of such a diameter to loosely fit within one end of the sleeve 35 of the lifting bar 27, so as to be movably or rotatably connected thereto when the parts are assembled, and for a purpose subsequently to be described. The outer end of the turning arm or bar 31 has welded or otherwise connected thereto a threaded nut 43 for receiving the threaded shank of hook bolt 44 and a locking nut 45 (Fig. 1). The bolt 44 is connected as at 46 to a lug 47 that extends laterally from one side of the bar 38. Thus, it will be seen that the hook bolt 44 provides an adjustable connection of the turning bar 31 with the transverse member 38. A pair of transversely disposed overcenter bars or members 48 and 49 are positioned in front of the bar 38. The outer ends of the bars 48 and 49 are pivotally connected as at 50 to the jaws or forks 39 (Fig. 1). The bar 48 has a channel or recessed rear side 51 (Fig. 11) and the bar 49 is formed with a similar channel 52 of slightly wider width than the channel 51. A release member in the form of a bell crank 53 is pivoted at 14 to one end of the bar 38 and to the adjacent fork 39 (Fig. 1). The bell crank 53 has an advancing arm 54 that extends forwardly slightly beyond the bar 38, and is pivoted as at 55 to a centrally disposed link 56 which in turn is pivotally connected to the inner ends of the overcenter bars 48 and 49 as at 57, so as to provide the link 56 and arms 48 and 49 with a common pivotal connection. A strap or member 58 is welded as at 59 (Fig. 12) to the inner end of the overcenter bar 48 and extends axially and outwardly therefrom, so as to fit within the channel portion or recess 52 of the overcenter bar 49 (Fig. 11) when the bale loader attachment is in its lowermost position (Fig. 1). The free end of the bar 58 has a threaded pin 60 welded thereto as at 61 (Fig. 12) and extends rearwardly and transversely of the rod 58 so as to extend into the channel 52 of the bar 49 when the overcenter bars are in transverse alignment or the position shown in Figure 11. An enlarged nut 62 is threaded on the outer end of the bolt 61 and a washer 63 may be interposed between the nut 62 and the adjacent face of the bar 49 to provide means for limiting the amount the overcenter arms 48 and 49 are permitted to move outwardly past dead center, when the bale loader and its associated parts are in their lowermost or pick-up position.

The pivotal connection of the inner ends of the overcenter arms 48 and 49 with the link 56 allows a slight lateral movement of the arm 54 of the bale release bell crank relative to the overcenter arms 48 and 49.

The rearwardly extending arm 64 of the bell crank 53 has an eye bolt 65 extending loosely and upwardly therefrom so as to provide a swivel connection therewith. A release rod 66 is pivotally connected at one end as at 67 to the lifting rod 27 (Fig. 1) and extends loosely through the eye bolt 65. The opposite end of the rod 66 is externally threaded so as to receive a retaining nut 68. A stop pin 69 is connected to the rod 66 between the eye bolt and the nut 68 and is normally spaced from the eye bolt 65. Surrounding the rod 66 and confined between the nut 68 and the pin 69, is a coil compression spring 70. A transverse spring 71 is connected at one end to a jaw or fork 39 (Fig. 3) and at its opposite end is connected as at 72 to a chain 73 which, in turn, is connected to the opposite gripper or fork 39 so as to provide yieldable means for normally urging the spaced forks 39 towards each other.

The pivotal connection of the bar or plate 58 within the channel 52 of the overcenter bar 49 provides a scissor-like pivot point at 57 that coacts with the spring 71 to facilitate the movement of the jaws 39 from their open to their gripping position with the bale 41. The spring 71 also functions to maintain the inner ends of the bars 48 and 49 slightly in advance of center when the loader is in its bale-engaging position and after the bale has been released. The threaded bolt 60 which received the adjusting nut 62, hinges inside the channel 52 of the arm 49 when the bale-holding assembly is in the position, as shown in Figure 1 of the drawing, thus providing additional means for insuring the operation of the jaws 39. It will be noted that both the lifting arm 27 and the turning arm 31 are pivotally connected to the inclined shaft 19 and that the connection 32 of the bar 31 is offset relative to the connection of the sleeve 24 with the shaft 19. Further, both the members 27 and 31 are pivotally or movably connected to the transverse member 38 of the bale-engaging assembly 37. Also, the turning member 31 is provided with means for longitudinally adjusting its connection with the bar 38.

A hydraulic operating cylinder or the like 75 (Fig. 1) is mounted on the draw bar hitch frame 17 and may be pivotally connected at one end to a pair of spaced upstanding lugs 76 as at 77 (Fig. 4). Reciprocally mounted in the cylinder 75 is a piston having an outwardly extending piston rod 78 connected to a bifurcated member 79 which, in turn, is pivotally connected to an intermediate lug or arm 80 on the sleeve 24 as at 81. A pair of flexible pipes or tubes 82 and 83 (Fig. 1) communicate as at 84 with the interior of the cylinder 75 on opposite sides of the piston for imparting reciprocating movement to the piston rod 78 so as to cause oscillation of the sleeve 24 for raising and lowering the loader attachment including the bale-engaging assembly 37. A control valve mechanism 85 is connected to each of the flexible pipes 82 and 83 and is positioned adjacent the seat 86 of the tractor, so as to be conveniently under the control of the operator for raising or lowering the loader and the bale-engaging assembly as the tractor is moved forwardly during the loading operation. A wagon, trailer, or rack 87 is connected by a tongue 88 to the hitch frame 17 as at 89 for receiving the bales as they are picked up by the loader and raised to a position above and to the rear of the tractor.

Operation

In operation, the driver of the tractor initially lowers the bale loader attachment to its lowermost position adjacent the ground (Fig. 1), so that it extends outwardly from one side of the tractor. The rod 60 is adjusted by the nut 62 so as to control or limit the amount the overcenter arms 48 and 49 are moved forwardly past dead center. The advancing arm 54 of the bell crank 53 extends outwardly beyond the overcenter arms 48 and 49 so that the operator drives the tractor along one side of the row of bale windrows 49 lying on the ground, and guides the tractor to bring a bale 41 between the now outwardly inclined forks 39. As the tractor moves forward, each of the round bales 47 contacts the arm 54 of the bell crank, so as initially to move the bars 48 and 49 over dead center. As the forks 39 are operatively connected to the arms 48 and 49, they are simultaneously moved inwardly into gripping engagement with the adjacent sides of the bale 41 due to the tension of the spring 73. At the same time, the force exerted by the bale 41, causes the overcenter arms 48 and 49 to pivot in the middle as at 57 and hinge rearwardly in the center so as to assume the inclined position, as shown in Figure 3. The piston rod 78 of the hydraulic cylinder 75 when the loader attachment is in its lowermost position, as shown in Figure 1, is retracted within the cylinder 75. After the bale 41 is engaged by the forks 39 (Fig. 3), the operator actuates the hydraulic control valve 85, which causes outward movement and extension of the piston rod 78 and rotation of the inclined sleeve 24 in a counterclockwise direction, so as to pick up or raise the bale 41 engaged by the bale assembly 37. When the lifting arm 27 and the turning arm 31 are initially raised from their lowermost position, the arm 31 is disposed substantially parallel to the arm 27. As the loader continues to raise to its uppermost position, due to the fact that the center of rotation of the turning arm 31 is offset relative to the center of rotation of the lifting arm 27, the turning arm crosses the lifting arm 27 (Fig. 2), so that now the inner end of the turning arm 31 adjacent the inclined shaft 19, is positioned to the right of the inner end of the lifting arm 27. At the same time, the bale assembly 39 which is pivotally or rotatably connected by the pin 42 on the bar 38 to the sleeve 35 on the end of the lifting member 27 (Fig. 6), is rotated a half-turn or through substantially 90° with respect to the lifting arm 27 so that, when the bale loader reaches its uppermost position, the bale engaged by the bale assembly 39 is positioned above and to the rear of the tractor 15 so as to be loaded on the truck 87 or other suitable vehicle being towed by the tractor. As the bale 41 reaches its uppermost position (Fig. 2), the rotation of the bale assembly 37 and and the bale 41 about the lifting arm 27 causes the bale release rod 66 to move about its pivot 67 and the looped bolt 65 to rotate in order to permit the rod 66 to slide freely through it. This sliding movement continues until the spring 70 (Fig. 3) engages the eye bolt 65 (Fig. 2). When this contact is made, the bell crank 53 is held stationary with respect to the lifting arm 27, while the turning arm 31 continues to rotate the transverse bar 38 and the bale-engaging assembly 39 on pivot pin 42. This relative movement pulls the bell crank 53 from its position as shown in Figure 3 to its initial position (Fig. 1) so as to release the bale 41. The overcenter arms 48 and 49 are also moved forwardly in the center until they are ahead of dead center, where they are maintained by the tension of the spring 12. Thus, it will be seen that the bale-holding forks 39 are forced apart and released from engagement with the bale 41 when the loader and its associated parts are in their uppermost position and the bale above the wagon or trailer 87, by the operation of the bell crank 53, so as to drop the bale onto the wagon as the tractor is moved along the ground. When the bale is released from the loader, the operator actuates the hydraulic control valve 85 to retract the piston 78, and the loader and bale-engaging assembly 37 are swung back to their lowermost position adjacent the ground ready to pick up the next bale as the tractor 15 continues its forward movement.

It will be noted that, when the loader attachment is moved to its raised and rear position, the fork assembly 39 and the bale 41 engaged therewith are substantially perpendicular to the lifting arm 27 and that the bale-holding forks 39 extend axially and substantially parallel to the lifting arm 27. The mounting support for the inclined shaft 19 and sleeve or tubular member 24 may vary depending upon the make and model of the farm vehicle or tractor with which the bale loader attachment is to be used. However, irrespective of the supporting means for the loader attachment, shaft 19 and the rotatable sleeve 24 are preferably inclined towards the front of the tractor at an angle of substantially 40°, so that initially when the bale loader is in its lowermost position, it extends laterally from one side of the tractor (Fig. 1). The offset center of rotation of the turning member 31 relative to the center of the lifting member 27, causes the bale assembly 39 and its associated parts to be rotated through substantially 90° as the loader is moved from its lowermost position to its uppermost position, so that the loader is moved from one side of the tractor to the rear and above the same in order to deposit each bale on a vehicle or trailer towed by the tractor, at a minimum expenditure of time, labor and cost.

Thus, it will be seen that a simple, efficient, compact, and light bale loader attachment is provided, which can readily be connected to or disconnected from any suitable vehicle such as a tractor or the like. In other words, one man can mount or dismount the loader so that the tractor may be used for other purposes. The attachment is so mounted on the tractor that, as the latter is moved along the ground and on one side of the row of bale windrows, the bales are singly and sequentially picked up and deposited on the trailer or truck towed by the tractor at the expenditure of very little time, thus making it possible to load bales that lie very close together as in a heavy irrigated hay crop. The attachment is equally efficient in picking up bales of hay where they are thinly scattered, since the action of the loader is independent of the forward speed of the tractor. Moreover, bales can be loaded which lie in any position in the windrow. This eliminates the necessity of turning the bales before they can be loaded. The loader attachment also readily handles extra heavy bales with ease and even retrieves those bales which have fallen into ditches provided, of course, that part of the bale is above the level of the ground, so as to contact the bell crank lever 53 as the loader is guided to position the bale between the outwardly inclined forks 39. A further advantage of the loader attachment is its ability to handle bales without damaging or loosening the twine or tearing the ends of round bales as well as bales of other shapes.

It will be noted that, when the loader attachment is in its uppermost position and the bale is released therefrom, the bale-engaging assembly is automatically returned to the same position it assumes when the bale loader is in its lowermost position and prior to engagement of the arm 54 of the bell crank 53 with a bale resting on the ground. While the attachment is preferably used for lifting round bales, it can be efficiently used with other shapes of bales and the like, for transferring them from place to place.

It will be understood that the form of the invention shown is merely illustrative of a preferred embodiment and that such changes may be made as come within the scope of the following claims.

I claim:

1. A loader attachment of the class described, including a support, a lifting member movably connected to said support, a turning member movably connected to said support, a bale assembly having a cross bar, means connecting the lifting member to said cross bar, means connecting the turning member to said cross bar, transversely spaced jaws pivotally connected to said cross bar, displaceable bars between said jaws and of shorter length than said cross bar, means pivotally connecting the outer ends of said displaceable bars to adjacent jaws, means pivotally connecting the inner ends of said displaceable bars to each other, and means operatively connected to said displaceable members and positioned in the path of a bale so as to be actuated thereby for moving the jaws into engagement with the bale and the inner ends of the displaceable members away from the cross bar.

2. In combination with a tractor, a loader for lifting a bale on the ground at one side of the tractor and raising the bale to a discharge position at the side of the tractor, said loader including a lifting member movably connected to the tractor, a turning member pivotally connected at one end to the tractor, a bale-engaging assembly including a cross bar, means pivotally connecting the lifting member to said cross bar, means pivotally connecting the turning member to said cross bar so that the pivotal center of the turning member is offset relative to the pivotal center of the lifting member, said turning member when said assembly is in its lower position being disposed on one side of the lifting member, spaced displaceable transverse bars between said jaws, said displaceable pars being of less length than said cross bar and having their outer ends pivotally connected to adjacent jaws and their inner ends disposed substantially centrally between said jaws, a link pivotally connecting the inner ends of the displaceable bars so as to normally maintain the same in transverse alignment, a bell crank pivotally connected to one end of said cross bar and having a forward arm pivotally connected to said link, said bell crank having a rearwardly extending arm, a releasing rod pivotally connected to said lifting member and having a stop spaced from one end thereof, means slidably connecting said rod to the rearwardly extending arm of the bell crank, a coil spring on said rod between one end thereof and said stop and arranged to engage said last mentioned means when the lifting arm is raised a predetermined distance so as to arrest further movement of said bell crank and release the jaws from the bale.

3. In combination with a tractor or the like having an inclined supporting shaft, a bale loader including a tubular member rotatable on said shaft and having a lifting arm extending outwardly therefrom, means for oscillating said tubular member, a turning arm pivotally connected at one end to said shaft and extending outwardly in the same direction as the lifting arm, a cross bar, means pivotally connecting the outer end of the lifting arm to said cross bar, means connecting the outer end of the turning arm to said cross bar, transversely spaced bale-engaging jaws, means pivotally connecting said jaws to opposite ends of said cross bar, said jaws normally having an opened outwardly inclined position when moved adjacent the ground and operable to a closed parallel position so as to engage a bale and raise the same to a loading platform, transversely disposed displaceable bars between said jaws and having overlapping inner ends, said displaceable bars having their outer ends pivotally connected to adjacent jaws, a bell crank pivotally connected to said cross bar, said bell crank having a forwardly extending arm and a rearwardly extending arm, said forwardly extending arm projecting in front of said displaceable bars so as to be engageable with a bale, link means pivotally connecting said forwardly extending arm and the inner ends of said displaceable bars together, the inner connected ends of said displaceable bars being movable from a dead center position to a position ahead of dead center or the rear of dead center, adjustable means connected to one of said displaceable bars for controlling the outward movement of the inner ends of said displaceable bars past dead center, yieldable means for urging the jaws inwardly to their closed position, releasing means operatively connected to said lifting arm and said bell crank for releasing the jaws from the bale when the loader is raised a predetermined distance, means for returning the displaceable bars to their outwardly inclined position and hydraulic means operatively connected to said tubular member for rotating the same.

4. In combination with a tractor or the like, having an inclined supporting shaft, a bale loader including a tubular member rotatably on said shaft and having a lifting arm extending outwardly therefrom, means for oscillating the tubular member on said shaft to move the same from a lower to a raised position, a turning arm pivotally connected at one end to said shaft and extending outwardly in the same direction as the lifting arm, the pivotal connection of the turning arm being offset relative to the center of rotation of the lifting arm, a cross bar, means for pivotally connecting the outer end of the lifting arm to an intermediate portion of said cross bar, means pivotally connecting the outer end of the turning arm to the cross bar, transversely spaced jaws, means pivotally connecting said jaws to opposite ends of said cross bar, said jaws normally having an opened outwardly inclined position and movable to a closed parallel position, transversely disposed displaceable bars between said jaws, said displaceable bars being shorter than said cross bar, said displaceable bars having overlapping inner ends and outer ends pivotally connected to adjacent jaws, a bell crank pivotally connected to said cross bar, said bell crank having a forward arm and rearwardly extending arm, said forward arm extending in front of said displaceable bars so as to be engageable by a bale, link means pivotally connecting said forward arm and the inner ends of said displaceable bars, the inner connected ends of said displaceable bars being normally movable from a dead center position to a position ahead of dead center, and also to a point to the rear of dead center, adjustable means connected to one of displaceable bars and engageable with the other of said displaceable bars adjacent their pivotal connection with each other for controlling the movement of the inner ends of the displaceable bars forwardly past dead center, yieldable means for urging the jaws inwardly to their closed position, bale-releasing means operatively connected to said lifting arm and said bell crank for releasing the jaws from the bale when the loader is raised a predetermined distance, and means for returning the displaceable bars to their dead center position, and means when the jaws engage the bale for raising the loader to its discharge position.

5. In combination with a tractor or the like, a loader for lifting a bale on the ground at one side of the tractor and raising it to a discharge position at the rear of the tractor, said loader including a lifting arm rotatably connected to the tractor and extending laterally from one side thereof, a cross bar spaced laterally from the tractor, means movably connecting said cross bar to said lifting arm, transversely spaced jaws pivotally connected to said cross bar for engaging a bale on the ground, a pair of displaceable bars extending transversely between said jaws and in front of said cross bar, each of said displaceable bars having an outer end pivotally connected to an adjacent jaw and overlapping inner ends, a link pivotally connecting the inner ends of said displaceable bars, a bell crank pivotally connected to said cross bar, said bell crank having a forwardly extending arm pivotally connected to said link, adjustable means for normally urging the pivoted inner connected ends of the displaceable bars to a position ahead of dead center, spring means connecting said jaws for maintaining the displaceable bars in their forward position, a release rod pivotally connected to the lifting arm, means connecting said lifting arm to the other arm of said bell crank, the forward arm of said bell crank being positioned so as to contact with the bale when the loader is in its lower position so as to cause the jaws to move inwardly and grip the bale and the displaceable bars to pivot in the middle and hinge rearwardly, and means when the loader is being raised to its discharge position for rotating the bale assembly substantially 90° so as to position the same above and to the rear of the tractor, means when the loader is raised to its discharge position for releasing the bale, and means for returning the bale assembly to its lowermost position when the bale is released therefrom.

6. In combination with a tractor, an inclined support connected to the tractor and extending longitudinally thereof, a sleeve rotatably mounted on said shaft and having a lifting arm extending outwardly and laterally from one side thereof, means for rotating the sleeve on said shaft, a turning arm pivotally connected at one end to said shaft and extending outwardly in the same direction as the lifting arm, the turning arm pivotally connected with said shaft being offset relative to the center of rotation of the lifting arm, a cross bar, means for pivotally connecting the outer end of the lifting arm to an intermediate portion of said cross bar, means pivotally connecting the outer end of the turning arm to said cross bar, transversely spaced bale-engaging forks, means pivotally connecting said forks to opposite ends of said cross bar, transversely aligned overcenter bars between said forks, means pivotally connecting the inner ends of said overcenter bars together, means pivotally connecting an outer end of each overcenter bar to an adjacent fork, a bell crank lever pivotally connected to said cross bar adjacent one of said forks, link means pivotally connected to one arm of said bell crank and to the inner ends of said overcenter bars, a bale-releasing rod pivotally connected to said lifting arm, an eye bolt rotatably mounted on the other arm of the bell crank, said releasing rod extending loosely through said eye bolt and having stop means normally spaced from said eye bolt, a coil spring on said rod and confined between one end thereof and said stop means, means for normally urging the inner ends of said overcenter bars outwardly at the center so that their inner ends are ahead of dead center, said bell crank having an arm thereof extending outwardly of the overcenter bars so as to contact a bale and for automatically causing the spaced forks to be moved into engagement with the adjacent sides of the bale so as upon rotation of said sleeve for causing the raising of the bale to its unloading position, spring means for normally maintaining said overcenter bars ahead of dead center, and means for releasing the bale when the lifting arms and the turning arm are moved to their raised position.

7. In combination with a tractor, as called for in claim 6, in which hydraulic operated means is operatively connected to said sleeve for controlling the oscillating movement thereof.

8. In combination with a farm tractor or the like, a loader for lifting a bale on the ground at one side of the tractor and raising it to a discharge position at the rear of the tractor, said loader including a lifting arm rotatably connected to the tractor and extending laterally from one side thereof, a cross bar spaced laterally from the tractor, means movably connecting said cross bar to said lifting arm, transversely spaced jaws pivotally connected to said cross bar for engaging a bale on the ground, a pair of displaceable bars extending transversely between said jaws and in front of said cross bar, each of said displaceable bars having an outer end pivotally connected to an adjacent jaw and overlapping inner ends, a link pivotally connecting the inner ends of said displaceable bars for limiting the amount the latter may move forwardly past the center thereof, a bell crank pivotally connected to one end of said cross bar and having an arm extending in advance of said displaceable bars and pivotally connected to said link, the other arm of said bell crank extending rearwardly and overlapping said lifting member and said turning member, and yieldable means operatively connected to the rearwardly extending arm of the bell crank and said lifting member for arresting the movement of the bell crank when the loader is moved a predetermined distance above the ground, so as to release the jaws from the bale.

9. A loader attachment for farm vehicles including a support, a bale loader having a lifting member pivotally connected to said support, a bale engaging assembly, means rotatably connecting said lifting member to said bale assembly so as to move the latter from a normal lowermost position adjacent the ground to a discharge position above the vehicle and for allowing rotation of the assembly relative to said lifting member, said bale assembly having spaced movable gripping means for releasably receiving a bale therebetween, means connected to said gripping means and operable upon contact of a bale therewith for actuating said gripping means to engage opposite sides of the bale when the bale loader is in its lowermost position, and displaceable means connected to said lifting member and operable by rotation of the bale assembly and said gripping means, said displaceable means including a bell crank pivotally connected to said bale assembly, said lifting member having a releasing rod pivotally connected thereto, means slideably connecting said rod to one arm of said bell crank, and means for preventing pivotal movement of the bell crank when the bale assembly is raised to its discharge position so as to cause rotation of the bale assembly relative to the lifting member and release of the gripping means from the bale.

References Cited in the file of this patent

UNITED STATES PATENTS

| | | |
|---|---|---|
| 1,021,469 | Nameche | Mar. 26, 1912 |
| 1,452,679 | Fisher | Apr. 24, 1923 |
| 2,348,899 | Guignard et al. | May 16, 1944 |
| 2,445,076 | Munson | July 13, 1948 |
| 2,531,070 | McDermott | Nov. 21, 1950 |
| 2,634,003 | Williamson et al. | Apr. 7, 1953 |
| 2,643,604 | Hansen | June 30, 1953 |
| 2,704,164 | David | Mar. 15, 1955 |
| 2,757,807 | Ringness | Aug. 7, 1956 |
| 2,772,007 | Johnson | Nov. 27, 1956 |
| 2,772,793 | Brusewitz | Dec. 4, 1956 |
| 2,790,564 | Rockwell | Apr. 30, 1957 |